US009384952B2

(12) United States Patent
Brown et al.

(10) Patent No.: US 9,384,952 B2
(45) Date of Patent: Jul. 5, 2016

(54) METHOD OF MS MASS SPECTROMETRY

(71) Applicant: Micromass UK Limited, Wilmslow (GB)

(72) Inventors: Jeffery Mark Brown, Hyde (GB); Martin Raymond Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/401,346

(22) PCT Filed: May 16, 2013

(86) PCT No.: PCT/GB2013/051260
§ 371 (c)(1),
(2) Date: Nov. 14, 2014

(87) PCT Pub. No.: WO2013/171494
PCT Pub. Date: Nov. 21, 2013

(65) Prior Publication Data

US 2015/0090875 A1 Apr. 2, 2015

Related U.S. Application Data

(60) Provisional application No. 61/650,051, filed on May 22, 2012, provisional application No. 61/715,548, filed on Oct. 18, 2012.

(30) Foreign Application Priority Data

May 18, 2012 (GB) .................................. 1208741.7
Oct. 16, 2012 (GB) .................................. 1218519.5

(51) Int. Cl.
*H01J 49/04* (2006.01)
*G01N 30/00* (2006.01)
*H01J 49/00* (2006.01)

(52) U.S. Cl.
CPC ......... *H01J 49/0045* (2013.01); *H01J 49/0031* (2013.01)

(58) Field of Classification Search
CPC ............. H01J 49/0031; H01J 49/0036; H01J 49/0045; H01J 49/0072; H01J 49/004; H01J 49/065; H01J 49/0027; H01J 49/04; H01J 49/0095; H01J 49/4265; G01N 30/72; G01N 30/8665; G01N 30/8644; G01N 30/8668; G01N 30/8679
USPC ............ 250/281, 282, 288, 292, 423 R, 424, 250/396 R; 702/27, 30
See application file for complete search history.

(56) References Cited

U.S. PATENT DOCUMENTS 6,627,875 B2 9/2003 Afeyan et al.
6,717,130 B2 4/2004 Bateman et al.
6,852,971 B2 2/2005 Baba et al.
(Continued)

*Primary Examiner* — David A Vanore
(74) *Attorney, Agent, or Firm* — Diederiks & Whitelaw, PLC

(57) ABSTRACT

A method of mass spectrometry is disclosed comprising alternating between a first mode in which parent ions are analysed and a second mode in which parent ions are fragmented and their fragment ions are mass analysed. In the first mode the parent ions are charge reduced before being analysed, so as to simplify the parent ion spectral data obtained. In the second mode, the parent ions are not charge reduced prior to fragmentation, so that it remains relatively easy to induce the parent ions to fragment. The parent ions are then associated with their fragment ions using the mass spectral data obtained.

20 Claims, 4 Drawing Sheets

(56) References Cited

U.S. PATENT DOCUMENTS

| | | | | |
|---|---|---|---|---|
| 6,982,414 | B2 | 1/2006 | Bateman et al. | |
| 7,026,610 | B2 | 4/2006 | Kato | |
| 7,026,613 | B2 * | 4/2006 | Syka | H01J 49/0095 250/282 |
| 7,196,326 | B2 | 3/2007 | Franzen et al. | |
| 7,446,312 | B2 | 11/2008 | Rather | |
| 7,555,393 | B2 * | 6/2009 | Sadygov | G01N 33/6848 702/19 |
| 7,582,862 | B2 * | 9/2009 | Hartmer | H01J 49/145 250/281 |
| 7,642,509 | B2 * | 1/2010 | Hartmer | H01J 49/0045 250/281 |
| 7,858,929 | B2 * | 12/2010 | Makarov | H01J 49/06 250/281 |
| 7,872,228 | B1 * | 1/2011 | Kim | H01J 49/423 250/287 |
| 8,080,783 | B2 * | 12/2011 | Whitehouse | H01J 49/0431 250/282 |
| 8,105,838 | B2 * | 1/2012 | Gorenstein | G01N 30/72 436/86 |
| 8,143,066 | B2 * | 3/2012 | Gorenstein | G01N 30/72 436/86 |
| 8,165,820 | B2 * | 4/2012 | Gorenstein | G01N 30/72 250/282 |
| 8,168,943 | B2 | 5/2012 | Schwartz et al. | |
| 8,188,423 | B2 * | 5/2012 | Doroshenko | H01J 49/0045 250/281 |
| 8,237,106 | B2 * | 8/2012 | Castro-Perez | H01J 49/0031 250/281 |
| 8,362,424 | B2 * | 1/2013 | Brown | H01J 49/065 250/281 |
| 8,410,437 | B2 * | 4/2013 | Brown | H01J 49/065 250/281 |
| 8,426,155 | B2 | 4/2013 | Hartmer et al. | |
| 8,447,527 | B2 * | 5/2013 | Gorenstein | G01N 30/72 250/282 |
| 8,507,849 | B2 | 8/2013 | Brown | |
| 8,710,430 | B2 * | 4/2014 | Sugiyama | H01J 49/0009 250/283 |
| 8,723,110 | B2 * | 5/2014 | Whitehouse | H01J 49/0431 250/282 |
| 8,809,768 | B2 | 8/2014 | Bateman | |
| 8,822,914 | B2 * | 9/2014 | Goshawk | H01J 49/0027 250/281 |
| 9,111,735 | B1 * | 8/2015 | Nikolaev | H01J 49/0036 |
| 2006/0255261 | A1 | 11/2006 | Whitehouse et al. | |
| 2009/0302210 | A1 * | 12/2009 | Castro-Perez | H01J 49/0031 250/282 |
| 2009/0321628 | A1 * | 12/2009 | Bateman | H01J 49/0036 250/282 |
| 2011/0062323 | A1 * | 3/2011 | Brown | H01J 49/0072 250/282 |
| 2015/0090875 | A1 * | 4/2015 | Brown | H01J 49/0031 250/282 |
| 2015/0287584 | A1 * | 10/2015 | Green | H01J 49/0031 250/287 |

* cited by examiner

METHOD OF MS MASS SPECTROMETRY

This application is the National Stage of International Application No. PCT/GB2013/051260, filed 16 May 2013, which claims priority to and the benefit of United Kingdom patent application No. 1208741.7 filed on 18 May 2012, United Kingdom patent application No. 1218519.5 filed on 16 Oct. 2012, U.S. patent application No. 61/650,051 filed on 22 May 2012 and U.S. patent application No. 61/715,548 filed on 18 Oct. 2012. The entire contents of these applications are incorporated herein by reference.

BACKGROUND OF THE PRESENT INVENTION

The present invention relates to a method of mass spectrometry and a mass spectrometer, wherein the mass spectrometer is alternated between a mode for analysing parent ions and a mode for generating and analysing fragment ions.

It is known to perform $MS^e$ mass spectral techniques in which parent ions are mass analysed in a first mode, and in which parent ions are fragmented and the resulting fragment ions mass analysed in a second mode. However, the spectral data obtained from such techniques is typically complex and so it may be difficult to associate parent ions in the parent ion data with their corresponding fragment ions in the fragment ion data.

It is desired to provide an improved method of mass spectrometry and an improved mass spectrometer.

SUMMARY OF THE PRESENT INVENTION

According to a first aspect of the present invention there is provided a method of mass spectrometry comprising:

(i) providing a plurality of parent ions;

(ii) reducing the charge state of parent ions by subjecting the parent ions to charge reduction conditions, and mass analysing the resulting charge reduced parent ions so as to obtain first mass spectral data;

(iii) fragmenting parent ions to produce fragment ions without having first reduced the charge state of the parent ions by exposing the ions to said charge reduction conditions, and mass analysing the fragment ions to obtain second mass spectral data;

(iv) wherein the parent ions are alternately and repeatedly subjected to said charge reduction conditions and said fragmenting so that the method repeatedly alternates between steps (ii) and (iii).

The present invention enables parent ion mass spectral data and corresponding fragment ion mass spectral data to be obtained and correlated in a more efficient manner. In particular, according to conventional techniques, different species of parent ions having different charge states may overlap in mass to charge ratio and so may interfere with each other in the mass spectral data. The present invention charge reduces the parent ions prior to their mass analysis and so the different species of parent ions become well separated in mass to charge ratio and can therefore be mass analysed and identified more easily. On the other hand, the present invention avoids performing the charge reduction of the parent ions in the mode in which the parent ions are fragmented. This enables the fragmentation of the parent ions to be induced more easily, as the parent ions maintain relatively high charge states. The present invention therefore renders the association of parent ions with their fragment ions more simple and efficient by switching between the two modes of operation.

Preferably, the charge reduction conditions are different to the fragmentation conditions such that the charge reduction conditions substantially do not result in any fragmentation of the parent ions.

The fragment ions are preferably not subjected to charge reduction before being mass analysed.

The two modes of operation are discrete modes. The parent ions from the charge reduction step are therefore preferably mass analysed over separate and different time periods to the time periods over which the fragment ions generated by the fragmentation step are mass analysed.

The method preferably alternates between steps (ii) and (iii) at a rate such that a given species of parent ion is subjected to both steps (ii) and (iii) so as to obtain parent ion mass spectral data and corresponding fragment ion mass spectral data for each species of parent ion.

The method is preferably automatically and continuously alternated between steps (ii) and (iii) at least x times, where x is: >5; >10; >15; >20; >30; >40; >50; >75; >100; >150; or >200.

The method is preferably automatically and continuously alternated between steps (ii) and (iii) at least once every 0.1, 0.2, 0.3, 0.4, 0.5, 0.6, 0.7, 0.8, 0.9, 1, 2, 3, 4, 5, 6, 7, 8, 9 or seconds.

The mass spectral data obtained according to the present invention is preferably used to associate parent ions with their fragment ions so as to identify the analyte from which the parent ions are derived. Accordingly, the method preferably comprises associating parent ions in the first mass spectral data with fragment ions in the second mass spectral data.

The fragmentation process may be Electron Transfer Dissociation ("ETD"), Electron Capture Dissociation ("ECD") or Collision Induced Dissociation ("CID"). Alternatively, other fragmentation processes may be used.

The method preferably comprises performing a cycle comprising the following steps, wherein the steps may be performed in any order of sequence within each cycle:

performing step (ii) described above;

performing step (iii) described above; and fragmenting parent ions to produce fragment ions having first reduced the charge state of the parent ions by exposing the ions to said charge reduction conditions, and mass analysing these fragment ions to obtain third mass spectral data.

The mass spectral data from the last step above may be correlated to the corresponding parent ion data in the same manner that the spectral data from steps (ii) and (iii) are correlated.

The cycle is preferably controlled automatically and may be continuously repeated y times, where y is: >5; >10; >15; >20; >30; >40; >50; >75; >100; >150; or >200.

Each cycle may be performed at least once every 0.1, 0.2, 0.3, 0.4, 0.5, 0.6, 0.7, 0.8, 0.9, 1, 2, 3, 4, 5, 6, 7, 8, 9 or seconds.

The step of fragmenting ions having first reduced the charge state of the ions produces some different mass spectral data to fragmenting the same ions that have not been reduced in charge state. For example, a comparison may be made between the first and second mass spectral data and between the first and third mass spectral data to determine which fragment ions are produced only in the second or third spectral data. This method therefore reveals additional mass spectral data than if only charge reduced ions are fragmented.

The step of fragmenting the parent ions without having first reduced the charge state of the parent ions may comprise fragmenting parent ions by a first fragmentation process to produce a first set of fragment ions from a given parent ion and may also comprise fragmenting parent ions by a second, different fragmentation process to produce a second, different set of fragment ions from the given parent ion. Alternatively, or additionally, the step of fragmenting the parent ions having first reduced the charge state of the parent ions may comprise fragmenting parent ions by a first fragmentation process to produce a first set of fragment ions from a given parent ion and may also comprise fragmenting parent ions by a second, different fragmentation process to produce a second, different set of fragment ions from the given parent ion.

The two fragmentation processes are preferably performed at different times such that mass spectral data is obtained for the first set of fragment ions at a first time and mass spectral data is obtained for the second set of fragment ions at a different time. A comparison may be made between the mass spectral data obtained from the two fragmentation techniques, and/or the fragment ion spectral data from each fragmentation technique may be compared to parent ion spectral data so as to determine which fragment ions are produced by which fragmentation technique. This method therefore reveals additional mass spectral data than if only one fragmentation technique is used.

The first fragmentation process may be one of ETD, ECD or CID and the second fragmentation process may be another of ETD, ECD or CID. Preferably, the first fragmentation process is ETD or ECD and the second fragmentation process is CID.

The method may further comprise increasing the charge state of parent ions; wherein step (ii) described above comprises reducing the charge state of these parent ions and then mass analysing the resulting ions so as to obtain said first mass spectral data; and wherein step (iii) described above comprises fragmenting the parent ions of increased charge state without having first reduced the charge state of these ions, and then mass analysing the resulting fragment ions to obtain said second mass spectral data.

The present invention preferably comprises associating parent ions detected in said first mass spectral data with fragment ions detected in said second mass spectral data. The method preferably repeatedly alternates between steps (ii) and (iii) above so as to alternate between obtaining the first mass spectral data and obtaining the second mass spectral data. The parent ions in any given set of first mass spectral data are preferably associated with fragment ions in a set of second mass spectral data that is obtained immediately before or immediately after said given set of first mass spectral data is obtained.

The method preferably alternates between steps (ii) and (iii) above at a rate such that each species of parent ion in said plurality of ions is subjected to both said steps (ii) and (iii).

The step of providing the plurality of parent ions preferably comprises providing different parent ions that are spatially separated from each other such that they are received at a mass analyser at different times and are mass analysed at different times in step (ii) described above. Preferably, the parent ions are subjected to fragmentation after they have been separated and such that fragment ions that are derived from different parent ions are mass analysed in step (iii) above at different times.

The parent ions may be subjected to chromatography and the step of associating parent ions detected in said first mass spectral data with fragment ions detected in said second mass spectral data may comprise matching chromatographic elution time profiles of ions observed in the first mass spectral data with chromatographic elution time profiles of ions observed in the second mass spectral data.

The parent ions may be generated by subjecting a sample to chromatography and ionising the eluting sample. The chromatography is preferably liquid chromatography. The step of associating parent ions detected in said first mass spectral data with fragment ions detected in said second mass spectral data may comprise matching chromatographic elution time profiles of ions observed in the first mass spectral data with chromatographic elution time profiles of ions observed in the second mass spectral data.

Alternatively, or additionally, different parent ions may be separated in an ion mobility spectrometer according to their ion mobility such that they are received at a mass analyser at different times and are mass analysed at different times in step (ii) above. The step of associating parent ions detected in the first mass spectral data with fragment ions detected in the second mass spectral data may comprise matching ion mobility drift time profiles of ions observed in the first mass spectral data with ion mobility drift time profiles of ions observed in the second mass spectral data.

The method may comprise comparing first and second mass spectral data that have been obtained at substantially the same time (i.e. in sequentially obtained spectral data sets), and recognising as parent ions, ions having a greater intensity in the first mass spectral data relative to the second mass spectral data. Alternatively, or additionally, the method may comprise comparing first and second mass spectral data that have been obtained at substantially the same time, and recognising as fragment ions, ions having a greater intensity in the second mass spectral data relative to the first mass spectral data.

According to the present invention, the parent ions may be generated by an Electrospray Ionisation ("ESI") ion source.

The parent ions may be reduced in charge state by interacting these ions with reagent anions or neutral superbase molecules. The anions may be generated by exposing a gas to corona discharge or electromagnetic waves, such as UV light. The reagent ions may neutralise singly charged background ions that are present with the parent ions.

The charge state of the parent ions may be reduced by Proton Transfer Reaction ("PTR").

The charge state may be reduced at atmospheric pressure. Additionally, or alternatively, the step of fragmenting the parent ions may be performed at atmospheric pressure.

The present invention also provides a method of identifying an analyte, preferably a biomolecule, comprising ionising the analyte to form parent ions and performing a method as described above.

The present invention also provides a mass spectrometer comprising:

a device arranged and adapted to reduce the charge state of ions;

a mass analyser;

a fragmentation device; and control means arranged and adapted to:

reduce the charge state of parent ions in the device arranged and adapted to reduce the charge state of ions by subjecting the parent ions to charge reduction conditions;

mass analyse the resulting charge reduced parent ions in the mass analyser so as to obtain first mass spectral data;

fragment parent ions in the fragmentation device so as to produce fragment ions without having first reduced the charge state of the parent ions by exposing the ions to the charge reduction conditions;

mass analyse the fragment ions in the mass analyser so as to obtain second mass spectral data; and repeatedly alternate between reducing the charge of the parent ions and fragmenting the parent ions.

The mass spectrometer may be arranged and configured so as to perform any one or combination of methods described herein.

According to a second aspect the present invention provides a method of mass spectrometry comprising:

generating a plurality of species of parent ions;

charge reducing the parent ions;

varying the intensity profile of one or more species of charge reduced parent ions as a function of time so that different species of parent ions are caused to have different intensity profiles as a function of time;

fragmenting parent ions without subjecting the parent ions to the charge reduction step so as to form fragment ions;

mass analysing the fragment ions; and correlating the fragment ions with corresponding charge reduced parent ions on the basis of the intensity profiles of said fragment ions and the intensity profiles of said charge reduced parent ions.

The method preferably comprises mass analysing the charge reduced parent ions in order to obtain said profile of one or more species of charge reduced parent ions.

The method according to the second aspect of the present invention may comprises any of the features described in relation to the first aspect of the present invention. For example, the charge reduction conditions are different to the conditions that cause said fragmenting, such that the charge reduction conditions preferably substantially do not result in any fragmentation of the parent ions.

The step of fragmenting the parent ions without having first reduced the charge state of the parent ions may comprise fragmenting parent ions by a first fragmentation process to produce a first set of fragment ions from a given parent ion and may also comprise fragmenting parent ions by a second, different fragmentation process to produce a second, different set of fragment ions from said given parent ion. The first fragmentation process is preferably Electron Transfer Dissociation ("ETD") or Electron Capture Dissociation ("ECD") and the second fragmentation process may be Collision Induced Dissociation ("CID").)

The method may further comprise increasing the charge state of parent ions before charge reducing the parent ions. The method may comprise fragmenting the parent ions which have been increased in charge state without first reducing the charge state of these ions.

The method preferably repeatedly alternates between charge reducing and mass analysing parent ions, and fragmenting parent ions without having first charge reduced them and mass analysing the fragment ions.

The method preferably alternates between the two modes at a rate such that each species of parent ion is subjected to both modes.

The step of varying the intensity profile of one or more species of charge reduced parent ions as a function of time preferably comprises subjecting an analyte sample to chromatography; and wherein parent ions are correlated with fragment ions by matching chromatographic elution time profiles of the parent and fragment ions.

Additionally, or alternatively, the step of varying the intensity profile of one or more species of charge reduced parent ions as a function of time may comprise separating the parent ions in an ion mobility spectrometer, and wherein the parent ions are correlated with fragment ions by matching ion mobility drift time profiles of the parent and fragment ions.

The step of reducing the charge state of the parent ions is preferably performed at atmospheric pressure.

The step of fragmenting the parent ions is preferably performed at atmospheric pressure.

The present invention also provides a mass spectrometer comprising:

an ion source for generating a plurality of species of parent ions;

means for charge reducing the parent ions;

means for varying the intensity profile of one or more species of charge reduced parent ions as a function of time so that different species of parent ions are caused to have different intensity profiles as a function of time;

means for fragmenting parent ions without subjecting the parent ions to the charge reduction step so as to form fragment ions;

means for mass analysing the fragment ions; and means for correlating the fragment ions with corresponding charge reduced parent ions on the basis of the intensity profiles of said fragment ions and the intensity profiles of said charge reduced parent ions.

The mass spectrometer is preferably arranged and configured so as to be able to perform any of the methods described herein.

The mass spectrometer may comprise any one or more of the following:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and an orbitrap (RTM) mass analyser comprising an outer barrel-like electrode and a coaxial inner spindle-like electrode, wherein in a first mode of operation ions are transmitted to the C-trap and are then injected into the orbitrap (RTM) mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap (RTM) mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to preferred methods, analyte ions are generated by an atmospheric pressure ion source, such as an electrospray ion source. The charge reduction of the parent analyte ions may be performed at atmospheric pressure, for example, by PTR reactions. This may be performed by creating reagent anions and causing the reagent ions to interact with the parent ions. The reagent ions may be generated by exposing volatile molecules to a UV light source. The reagent anions are capable of accepting or abstracting a proton from multiply charged or multiply protonated parent ions such that charge reduction of the ions occurs at atmospheric pressure. According to an embodiment, the charge reduction process may be intermittently interrupted by turning the UV light source ON and OFF, thereby intermittently halting the production of reagent anions.

An alternative method of performing charge transfer or charge reduction is to use a superbase compound as disclosed in, for example, US 2011/0114835 (Micromass). Another method of charge reduction is described by B. L. Frey, Y. Lin, M. S. Westphall and L. M. Smith "Controlling Gas-Phase Reactions for Efficient Charge Reduction Electrospray Mass Spectrometry of Intact Proteins" J Am Soc Mass Spectrom. 2005, 16(11), p. 1876-1887, wherein an atmospheric pressure corona discharge is used to produce reagent anions for proton transfer reactions.

The present invention reduces the amount of charge of ions prior to targeted or untargeted parent ion fragmentation. The preferred embodiments are particularly advantageous during the analysis of complex mixtures (e.g. protein digests) and may be used in conjunction with liquid chromatography (LC) and or ion mobility spectrometer (IMS) separation techniques.

$MS^e$ is a well established method of mass spectrometry. In $MS^e$ and $HDMS^e$ (i.e. ion mobility assisted $MS^e$) approaches, parent ion spectra are obtained in a low fragmentation mode and fragment ion spectra are obtained in a high fragmentation mode. The parent ions are then associated with fragment ions based on their simultaneous liquid chromatography time elution profiles, and/or in the case of $HDMS^e$, their simultaneous ion mobility time elution profiles. However, in the analysis of protein digests, the parent ion spectra can be complicated due to multiply-charged parent ions overlapping in a relatively narrow mass to charge ratio region of the mass spectrum. This is particularly problematic, for example, in electrospray ionisation since this form of ionisation commonly produces doubly and triply charged parent ions. This complexity can lead to mass interference in the parent ion mass spectra, resulting in misassignment or non-assignment of spectral peaks.

The charge reduction according to the preferred methods of the present invention has several beneficial effects in terms of reducing the complexity of the parent ion spectrum for $MS^e$ proteomics experiments. Firstly, the spectral peaks of highly charged parent ions which overlap are shifted to higher mass to charge ratios as ions are reduced in charge. Accordingly, overlapping spectral peaks are spread over a larger range of mass to charge ratios as the charge reduction occurs. This simplifies the parent ion spectra and reduces the occurrences of non-resolved or only partially resolved parent ions from different peptides.

Furthermore, the charge reduction technique also neutralises singly charged background ions and hence effectively removes these background ions from the parent ion mass spectral data. This further improves the signal to noise ratio within the mass spectrum. Both of the above effects can lead to more confident assignment of peptides within what can be a complex experiment.

According to the preferred embodiment, during the high fragmentation mode of a $MS^e$ experiment the charge reduction process is stopped so as to allow parent ions to remain in their higher charge state for fragmentation. The highly charged parent ions may then be fragmented, for example, by ETD fragmentation. Allowing the parent ions to remain relatively highly charged tends to improve the efficiency of the fragmentation process, particularly for ETD fragmentation.

Additionally, fragmentation techniques such as CID fragmentation may be performed on parent ions which have been subjected to charge reduction. In general, the fragment ions resulting from the fragmentation of charged reduced species will be different to those produced by fragmenting non-charge reduced parent ions, regardless of the method of charge reduction. Fragmentation of the charge-reduced parent ions can therefore yield additional information which may be unavailable from fragmentation of the non-charge reduced parent ions.

The methods of the preferred embodiments of the present invention therefore represent an improvement over existing methods by reducing the complexity of parent ion identification. The preferred methods also allow complimentary fragment ion information to be produced as compared to known methods and thereby increase the information content of the analysis.

The advantages described above are also applicable to scheduled MS-MS experiments such as Multiple Reaction Monitoring ("MRM") wherein both parent and fragment ions are known prior to acquisition. As both the singly charged noise and the likelihood of interference are reduced by the charge reduction, detection limits may advantageously be increased.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1A:
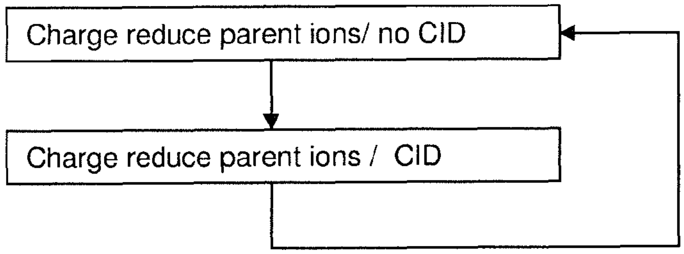
FIG. 1A illustrates an embodiment of the present invention wherein in one mode of operation mass spectral data is obtained for charge reduced parent ions and in another mode of operation mass spectral data is obtained for the fragments of charge reduced parent ions.
Figure 1B:
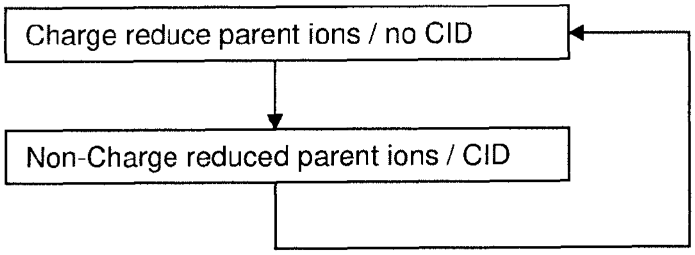
FIG. 1B illustrates an embodiment of the present invention wherein in one mode of operation mass spectral data is obtained for charge reduced parent ions and in another mode of operation mass spectral data is obtained for the fragments of non-charge reduced parent ions that have been subjected to CID fragmentation.
Figure 1C:
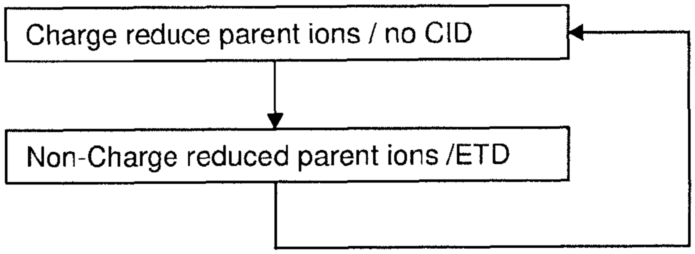
FIG. 1C illustrates an embodiment of the present invention wherein in one mode of operation mass spectral data is obtained for charge reduced parent ions and in another mode of operation mass spectral data is obtained for the fragments of non-charge reduced parent ions that have been subjected to ETD fragmentation.

According to the preferred method different parent ions are separated, for example, by eluting from a liquid chromatography device or passing through an ion mobility spectrometer. The parent ions pass through a fragmentation region as they travel towards a mass analyser. An $MS^e$ mass spectral technique is performed wherein the fragmentation region is repeatedly alternated between a low fragmentation mode and a high fragmentation mode. A parent ion mass spectrum is obtained in the low fragmentation mode and a fragment ion mass spectrum is obtained in the high fragmentation mode. The parent ions are then associated with their corresponding fragment ions, for example, based on their simultaneous liquid chromatography time elution profiles and/or ion mobility time elution profiles. FIGS. 1A-C illustrate three schemes of $MS^e$ methods according to preferred embodiments of the present invention.

According to the embodiment shown in FIG. 1A, in a first mode of operation, parent ions are charge reduced and then mass analysed to obtain first mass spectral data. CID fragmentation is not performed in this mode of operation, as it is desired to analyse the parent ions. In a second mode of operation, the charge reduced parent ions are subjected to CID fragmentation and the fragment ions are mass analysed to obtain second spectral data. The method repeatedly alternates between the two modes.

According to the embodiment shown in FIG. 1B, in a first mode of operation, parent ions are charge reduced and then mass analysed to obtain first mass spectral data. CID fragmentation is not performed in this mode of operation, as it is desired to analyse the parent ions. In a second mode of operation, the parent ions are not charge reduced, but are subjected to CID fragmentation. The fragment ions are mass analysed to obtain second spectral data. The method repeatedly alternates between the two modes.

According to the embodiment shown in FIG. 1C, in a first mode of operation, parent ions are charge reduced and then mass analysed to obtain first mass spectral data. Fragmentation is not performed in this mode of operation, as it is desired to analyse the parent ions. In a second mode of operation, the parent ions are not charge reduced, but are subjected to ETD fragmentation. The fragment ions are mass analysed to obtain second spectral data. The method repeatedly alternates between the two modes.

As described above, in $MS^e$ experiments a low fragmentation mode and a high fragmentation mode are performed so as to obtain parent and fragment ion spectra. According to an embodiment of the present invention, more than two modes of operation may be utilised in order to extract more information from a single sample injection. For example, according to an embodiment, any combination of the following sequences may be performed: (i) parent ions are mass analysed without being subjected to charge reduction and without being subjected to fragmentation; (ii) parent ions are subjected to charge reduction and are subsequently fragmented, e.g. by CID or ETD, and the fragment ions mass analysed; (iii) parent ions are subjected to charge reduction and are then mass analysed without having been fragmented; and (iv) parent ions are not subjected to charge reduction and are subsequently subjected to fragmentation, e.g. by CID or ETD, and the fragment ions mass analysed. The method may perform a cycle of two, three or four of these modes. The method may repeatedly perform such a cycle. The cycle in the preferred embodiment comprises more than two of the above modes of operation and so it is able to extract more information from a sample than conventional methods.

The method preferably switches between the different modes of operation at a rate that is fast enough to obtain data from each mode for each parent ion. The preferred method continuously cycles between the different modes of operation so as to obtain data from each mode of operation for each type of parent ion.

Figure 2:
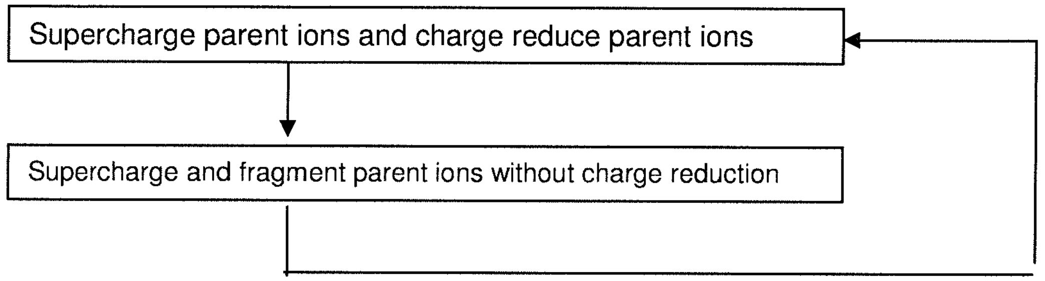
FIG. 2 illustrates a less preferred embodiment of the present invention in which the charge state of parent ions is increased and then in one mode of operation the ions are subjected to ETD fragmentation and mass analysed, and in another mode of operation the charge state of the parent ions is reduced and the parent ions are mass analysed.

Less preferred embodiments are also contemplated wherein the charge states of parent ions may be increased, i.e. supercharged, prior to fragmentation. An example of an $MS^e$ experiment including supercharging will now be described with reference to FIG. 2. The parent ions are initially supercharged such that they have relatively high charge states. In a first mode of operation, these parent ions are then subjected to charge reduction to reduce their charge states and are then mass analysed to obtain a parent ion spectrum. As has been described above, the parent ion spectra are simplified by reducing the charge of the parent ions. In a second mode of operation it is desired to fragment the parent ions. In this mode, the charge reduction process is turned OFF and the parent ions are then fragmented by ETD without having first been charge reduced. The supercharging is advantageous for fragmentation processes such as ETD since the higher charge states of the parent ions can lead to more efficient or informative fragment ion formation. The method repeatedly alternates between the two modes. It will be appreciated that the combination of supercharging and intermittent charge reduction enables optimisation of the processes for analysing both parent ions and fragment ions. The parent ions and their fragment ions may then associated, for example, by alignment of LC elution times or IMS drift times.

Supercharging may be achieved, for example, by adding a reagent such as m-nitrobenzylalcohol (MNBA) in the analyte solution prior to electrospray ionisation. This produces parent ions with an increased charge state than would have otherwise been produced.

Figure 3:
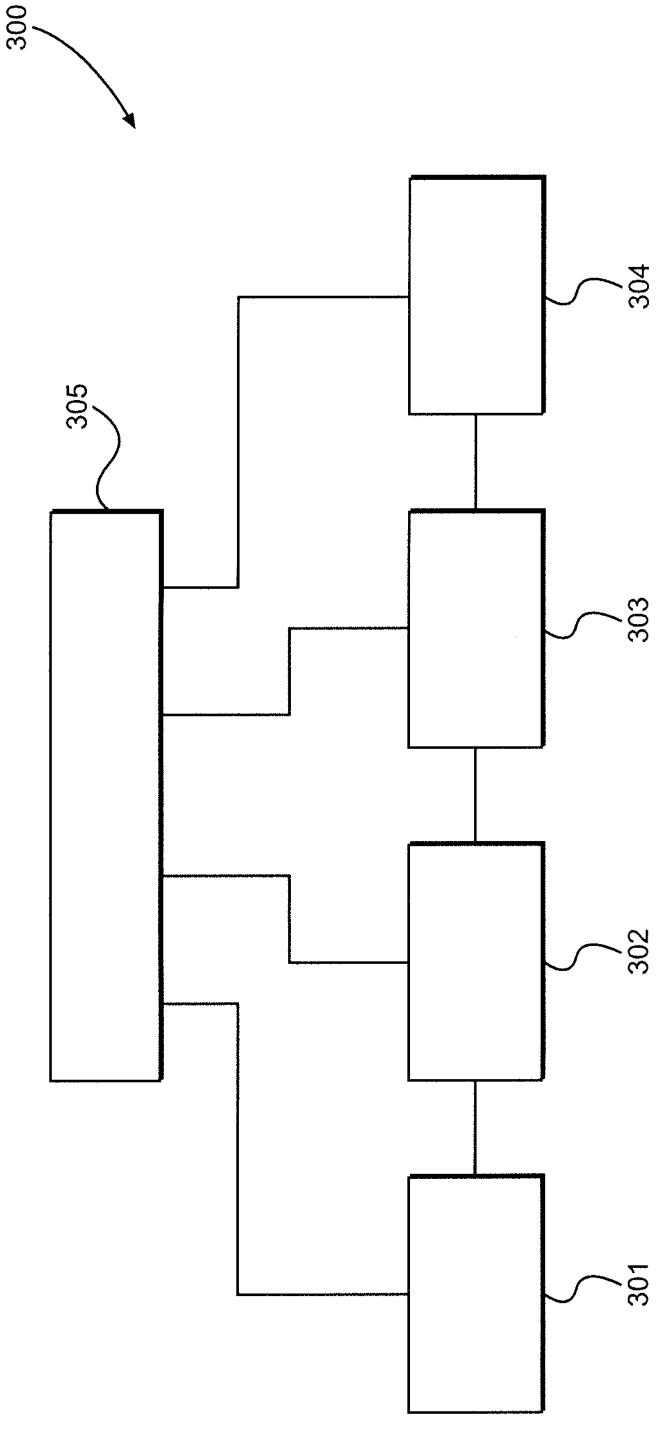
FIG. 3 schematically illustrates a mass spectrometer 300 according an embodiment of the invention.

In an embodiment, the present invention also provides a mass spectrometer 300, schematically illustrated in FIG. 3, comprising:

an ion source 301 for generating a plurality of species of parent ions;

a device 302 arranged and adapted to reduce the charge state of ions;

a mass analyser 304;

a fragmentation device 303; and control means 305 arranged and adapted to:

reduce the charge state of parent ions in the device 302 arranged and adapted to reduce the charge state of ions by subjecting the parent ions to charge reduction conditions;

mass analyse the resulting charge reduced parent ions in the mass analyser 304 so as to obtain first mass spectral data, fragment parent ions in the fragmentation device 303 so as to produce fragment ions without having first reduced the charge state of the parent ions by exposing the ions to the charge reduction conditions;

mass analyse the fragment ions in the mass analyser 304 so as to obtain second mass spectral data; and repeatedly alternate between reducing the charge of the parent ions and fragmenting the parent ions.

The mass spectrometer 300 is preferably arranged and configured so as to be able to perform any of the methods described herein.

Figure 4:
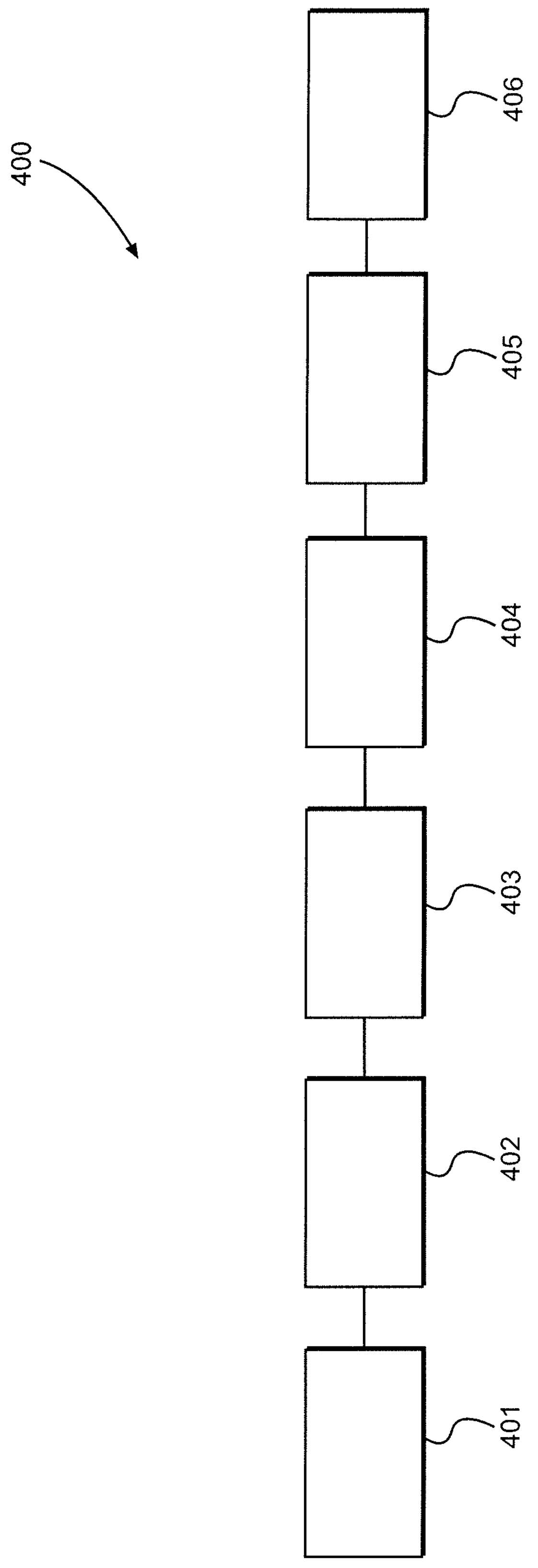
FIG. 4 schematically illustrates a mass spectrometer 400 according to another embodiment of the invention.

In another embodiment, the present invention provides a mass spectrometer 400, schematically illustrated in FIG. 4, comprising:

an ion source 401 for generating a plurality of species of parent ions;

means 402 for charge reducing the parent ions;

means 403 for varying the intensity profile of one or more species of charge reduced parent ions as a function of time so that different species of parent ions are caused to have different intensity profiles as a function of time;

means 404 for fragmenting parent ions without subjecting the parent ions to the charge reduction step so as to form fragment ions;

means 405 for mass analysing the fragment ions; and means 406 for correlating the fragment ions with corresponding charge reduced parent ions on the basis of the intensity profiles of said fragment ions and the intensity profiles of said charge reduced parent ions.

The mass spectrometer 400 is preferably arranged and configured so as to be able to perform any of the methods described herein.

Although the present invention has been described with reference to preferred embodiments, it will be understood by those skilled in the art that various changes in form and detail may be made without departing from the scope of the invention as set forth in the accompanying claims.

For example, it is contemplated that supercharging may be used for the formation of parent ions from neutral molecules. In this case, supercharging combined with alternate charge reduction can provide unique information with or without subsequent fragmentation.

Further embodiments are contemplated wherein charge reduction may be performed at atmospheric pressure or within a collision gas cell at sub-atmospheric pressure, e.g. within an RF gas cell.

It will be appreciated that various methods of fragmentation may be used according to embodiments of the present invention, such as CID, photo-fragmentation, ECD or ETD.

It is also contemplated that mass analysis may be performed whilst switching between charge reduced parent ions and non-charged reduced parent ions, without any fragmentation being performed. In this case only parent ions are identified so as to produce a peptide map. Different peptides may be identified in the charge reduced and the non-charge reduced data due to the differences in the regions with mass interferences. The sum of peptides identified may be greater than for either of the individual experiments. In this case the same parent ion with different charge states may be identified by retention time alignment.

The invention claimed is:

1. A method of mass spectrometry comprising:

(i) providing a plurality of parent ions;

(ii) reducing a charge state of parent ions by subjecting the parent ions to charge reduction conditions, and mass analysing the resulting charge reduced parent ions so as to obtain first mass spectral data;

(iii) fragmenting parent ions to produce fragment ions without having first reduced the charge state of the parent ions by exposing the ions to said charge reduction conditions, and mass analysing said fragment ions to obtain second mass spectral data;

(iv) wherein the parent ions are alternately and repeatedly subjected to said charge reduction conditions and said fragmenting so that the method repeatedly alternates between steps (ii) and (iii); and wherein the method comprises associating parent ions detected in said first mass spectral data with fragment ions detected in said second mass spectral data.

2. The method of claim 1, wherein said charge reduction conditions are different to the conditions that cause said fragmenting, such that the charge reduction conditions substantially do not result in any fragmentation of the parent ions.

3. The method of claim 1, wherein the method comprises perfoiining a cycle comprising the following steps in any order of sequence:

performing step (ii) of claim 1;

performing step (iii) of claim 1; and fragmenting parent ions to produce fragment ions having first reduced the charge state of the parent ions by exposing the ions to said charge reduction conditions, and mass analysing these fragment ions to obtain third mass spectral data.

4. The method of claim 1, wherein the step of fragmenting said parent ions without having first reduced the charge state of the parent ions comprises fragmenting parent ions by a first fragmentation process to produce a first set of fragment ions from a given parent ion and also comprises fragmenting parent ions by a second, different fragmentation process to produce a second, different set of fragment ions from said given parent ion; or wherein the step of fragmenting said parent ions having first reduced the charge state of the parent ions comprises fragmenting parent ions by a first fragmentation process to produce a first set of fragment ions from a given parent ion and also comprises fragmenting parent ions by a second, different fragmentation process to produce a second, different set of fragment ions from said given parent ion.

5. The method of claim 4, wherein the first fragmentation process is Electron Transfer Dissociation ("ETD") or Electron Capture Dissociation ("ECD") and the second, different fragmentation process is Collision Induced Dissociation ("CID").

6. The method of claim 1, further comprising increasing the charge state of parent ions;

wherein step (ii) comprises reducing the charge state of the parent ions which have been increased in charge state, and then mass analysing the resulting ions so as to obtain said first mass spectral data; and wherein step (iii) comprises fragmenting the parent ions which have been increased in charge state without having first reduced the charge state of these ions, and then mass analysing resulting fragment ions to obtain said second mass spectral data.

7. The method of claim 1, wherein the method repeatedly alternates between steps (ii) and (iii) so as to alternate between obtaining the first mass spectral data and obtaining the second mass spectral data, wherein parent ions in any given set of first mass spectral data are associated with fragment ions in a set of second mass spectral data that is obtained immediately before or immediately after said given set of first mass spectral data is obtained.

8. The method of claim 1, wherein the method alternates between steps (ii) and (iii) at a rate such that each species of parent ion in said plurality of ions is subjected to both said steps (ii) and (iii).

9. The method of claim 1, wherein the step of providing the plurality of parent ions comprises providing different parent ions that are spatially separated from each other such that they are received at a mass analyser at different times and are mass analysed at different times in step (ii).

10. The method of claim 9, wherein the parent ions are generated by subjecting a sample to chromatography and ionising the sample, and wherein parent ions detected in said first mass spectral data are associated with fragment ions detected in said second mass spectral data by matching chromatographic elution time profiles of ions observed in the first mass spectral data with chromatographic elution time profiles of ions observed in the second mass spectral data.

11. The method of claim 9, wherein different parent ions are separated in an ion mobility spectrometer according to their ion mobility such that the different parent ions are received at a mass analyser at different times and are mass analysed at different times in step (ii), and wherein the ions detected in the first mass spectral data are associated with fragment ions detected in the second mass spectral data by matching ion mobility drift time profiles of ions observed in the first mass spectral data with ion mobility drift time profiles of ions observed in the second mass spectral data.

12. The method of claim 1, wherein the step of reducing the charge state of the parent ions is performed at atmospheric pressure.

13. The method of claim 1, wherein the step of fragmenting the parent ions is performed at atmospheric pressure.

14. A mass spectrometer comprising:

a device arranged and adapted to reduce a charge state of ions;

a mass analyser;

a fragmentation device; and control means arranged and adapted to:

reduce a charge state of parent ions in said device arranged and adapted to Reduce the charge state of ions by subjecting the parent ions to charge reduction conditions;

mass analyse resulting charge reduced parent ions in said mass analyser so as to obtain first mass spectral data;

fragment parent ions in said fragmentation device so as to produce fragment ions without having first reduced the charge state of the parent ions by exposing the ions to said charge reduction conditions;

mass analyse said fragment ions in said mass analyser so as to obtain second mass spectral data;

repeatedly alternate between reducing the charge of the parent ions and fragmenting the parent ions; and associate parent ions detected in said first mass spectral data with fragment ions detected in said second mass spectral data.

15. A method of mass spectrometry comprising:

generating a plurality of species of parent ions;

charge reducing the parent ions;

varying an intensity profile of one or more species of charge reduced parent ions as a function of time so that different species of parent ions are caused to have different intensity profiles as a function of time;

fragmenting parent ions without subjecting the parent ions to the charge reduction step so as to form fragment ions;
mass analysing the fragment ions; and
correlating the fragment ions with corresponding charge reduced parent ions based on the intensity profiles of said fragment ions and the intensity profiles of said charge reduced parent ions.

16. The method of claim 15, comprising mass analysing the charge reduced parent ions in order to obtain said profile of one or more species of charge reduced parent ions.

17. The method of claim 16, wherein the method repeatedly alternates between charge reducing and mass analysing parent ions, and fragmenting parent ions without having first charge reduced them and mass analysing the fragment ions.

18. The method of claim 15, wherein said step of varying the intensity profile of one or more species of charge reduced parent ions as a function of time comprises subjecting an analyte sample to chromatography; and wherein parent ions are correlated with fragment ions by matching chromatographic elution time profiles of the parent and fragment ions.

19. The method of any one of claim 1, wherein said step of varying the intensity profile of one or more species of charge reduced parent ions as a function of time comprises separating the parent ions in an ion mobility spectrometer, and wherein the parent ions are correlated with fragment ions by matching ion mobility drift time profiles of the parent and fragment ions.

20. A mass spectrometer comprising:
an ion source for generating a plurality of species of parent ions;
means for charge reducing the parent ions;
means for varying the intensity profile of one or more species of charge reduced parent ions as a function of time so that different species of parent ions are caused to have different intensity profiles as a function of time;
means for fragmenting parent ions without subjecting the parent ions to the means for charge reduction so as to form fragment ions;
means for mass analysing the fragment ions; and
means for correlating the fragment ions with corresponding charge reduced parent ions based on the intensity profiles of said fragment ions and the intensity profiles of said charge reduced parent ions.

* * * * *